(12) United States Patent
Dietachmayr

(10) Patent No.: US 12,251,822 B2
(45) Date of Patent: Mar. 18, 2025

(54) METHOD FOR CONTROLLING A GRIPPER

(71) Applicant: GFM GmbH, Steyr (AT)

(72) Inventor: Harald Dietachmayr, Sierning (AT)

(73) Assignee: GFM GmbH, Steyr (AT)

( * ) Notice: Subject to any disclaimer, the term of this patent is extended or adjusted under 35 U.S.C. 154(b) by 778 days.

(21) Appl. No.: 17/604,042

(22) PCT Filed: Jun. 16, 2020

(86) PCT No.: PCT/AT2020/060244
§ 371 (c)(1),
(2) Date: Oct. 15, 2021

(87) PCT Pub. No.: WO2020/252512
PCT Pub. Date: Dec. 24, 2020

(65) Prior Publication Data
US 2022/0143845 A1     May 12, 2022

(30) Foreign Application Priority Data
Jun. 17, 2019   (AT) ................................ A50540/2019

(51) Int. Cl.
*B25J 15/06*   (2006.01)
*B25J 15/00*   (2006.01)
(Continued)

(52) U.S. Cl.
CPC ....... *B25J 15/0625* (2013.01); *B25J 15/0052* (2013.01); *B26D 7/1863* (2013.01);
(Continued)

(58) Field of Classification Search
CPC ................ B25J 15/0625; B25J 15/0052; B25J 15/0616; B26D 7/1863; B65H 29/241;
(Continued)

(56) References Cited

U.S. PATENT DOCUMENTS

| | | | |
|---|---|---|---|
| 5,063,800 A | 11/1991 | Jung et al. | |
| 10,512,965 B2 | 12/2019 | Prokop et al. | |
| 10,611,037 B1 * | 4/2020 | Polido | .................. B25J 15/0061 |
| 10,843,347 B1 * | 11/2020 | Murphy | ............... B25J 15/0616 |

(Continued)

FOREIGN PATENT DOCUMENTS

| | | |
|---|---|---|
| DE | 10 2008 032574 A1 | 1/2010 |
| DE | 10 2013 104 890 A1 | 11/2014 |

(Continued)

*Primary Examiner* — Stephen A Vu
(74) *Attorney, Agent, or Firm* — Muirhead and Saturnelli, LLC

(57) ABSTRACT

A gripper, which removes blanks from a web of material lying flat, includes gripping elements which can each be actuated separately. The gripping elements are mounted independently of one another in a frame so as to be displaceable perpendicularly to a reference plane parallel to the web of material. The gripping elements are set against the web of material and actuated in a takeover position of the gripper aligned with respect to the blank by means of a control device. In addition to the gripping elements located inside the contour line, there are also other gripping elements adjacent to the blank and located outside the contour line that are set against the material web as downholders. Gripping elements within the contour line of the blank are actuated and retracted from the material web, taking along the blank, before the gripper is lifted off the material web from the takeover position.

8 Claims, 6 Drawing Sheets

(51) Int. Cl.
 B26D 7/18 (2006.01)
 B65H 29/24 (2006.01)
 B65H 35/00 (2006.01)
(52) U.S. Cl.
 CPC ........... B65H 29/241 (2013.01); B65H 35/00 (2013.01); B65H 2406/30 (2013.01); B65H 2406/342 (2013.01); G05B 2219/39001 (2013.01); G05B 2219/39558 (2013.01)
(58) Field of Classification Search
 CPC ............... B65H 35/00; B65H 2406/30; B65H 2406/342; B65H 2406/31; B65H 2406/351; B65H 5/10; B65H 5/14; G05B 2219/39001; G05B 2219/39558; B65G 47/917; B65G 47/918
 See application file for complete search history.

(56) References Cited

U.S. PATENT DOCUMENTS

| | | | |
|---|---|---|---|
| 10,926,403 B1 * | 2/2021 | Asokan | ................ B25J 15/0052 |
| 10,933,537 B1 * | 3/2021 | Polido | .................... B25J 13/081 |
| 11,207,786 B1 * | 12/2021 | Polido | ................. B25J 15/0052 |
| 2005/0042323 A1 | 2/2005 | Habisreitinger et al. | |
| 2010/0007065 A1 | 1/2010 | Reinhold et al. | |
| 2010/0126320 A1 | 5/2010 | Macomber et al. | |
| 2017/0152115 A1 | 6/2017 | Montoya et al. | |
| 2021/0178540 A1 | 6/2021 | Wolf et al. | |

FOREIGN PATENT DOCUMENTS

| | | |
|---|---|---|
| DE | 10 2014 209 811 A1 | 11/2015 |
| DE | 10 2017 114 728 B3 | 10/2018 |
| WO | WO 03/035375 A1 | 5/2003 |
| WO | WO 2020/057852 A1 | 3/2020 |

* cited by examiner

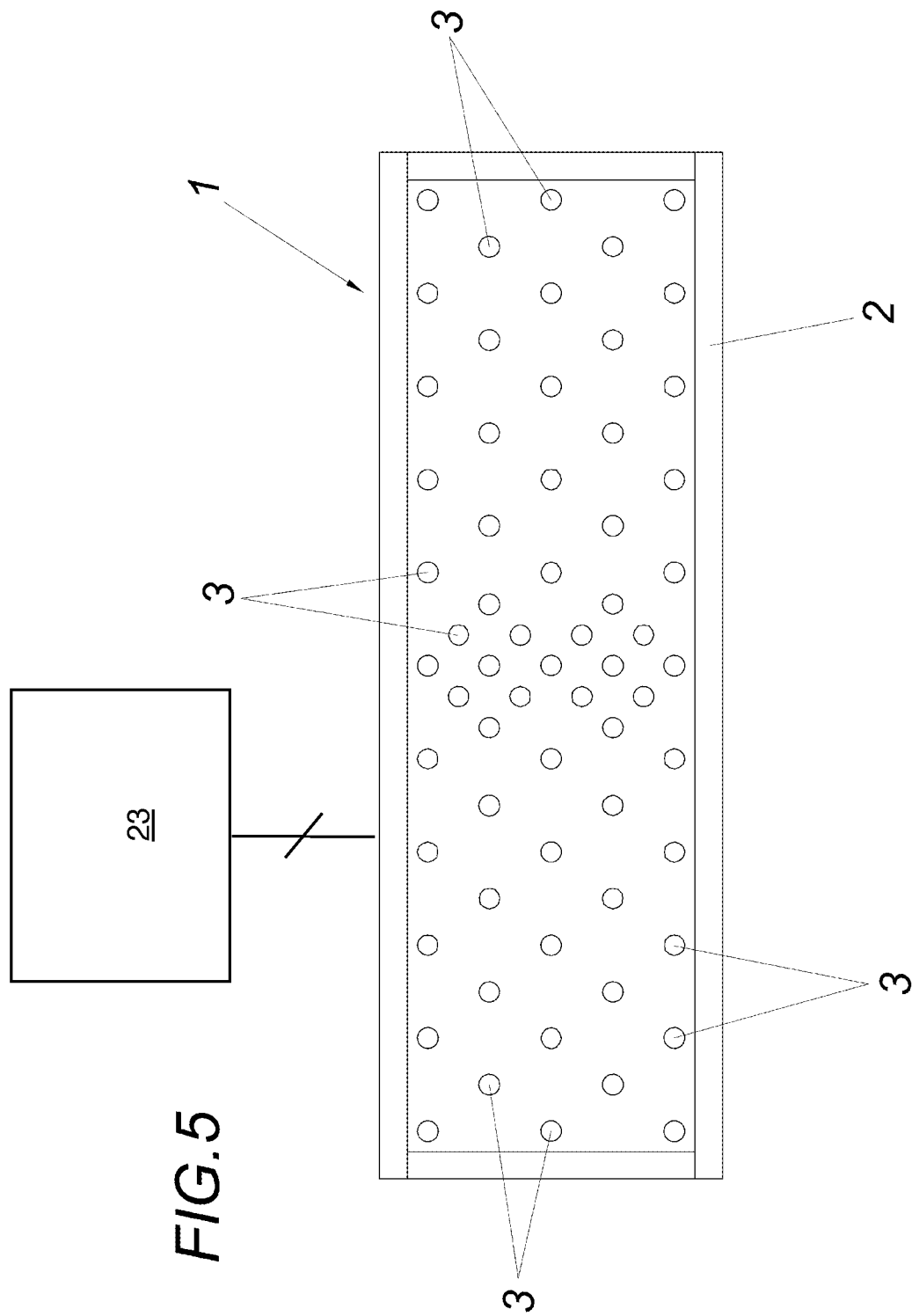

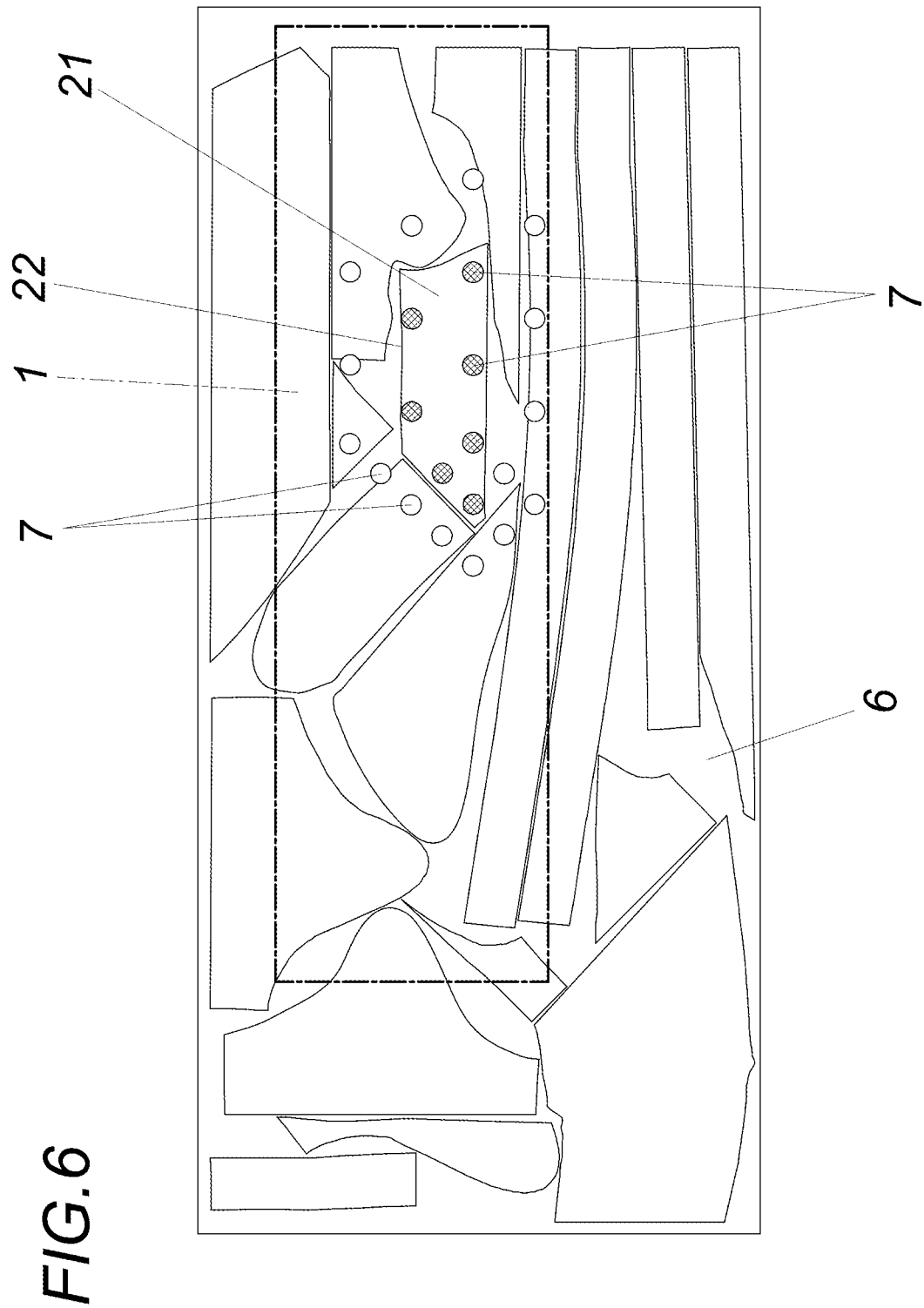

METHOD FOR CONTROLLING A GRIPPER

TECHNICAL FIELD

The system described herein relates to controlling a gripper which removes blanks from a web of material lying flat using gripping elements which can each be actuated separately.

BACKGROUND OF THE INVENTION

In order to be able to remove blanks of different shapes and sizes from a fiber layer lying on a cutting table, it is known (DE 10 2008 032 574 A1) to use a gripper with a plurality of suction heads which are distributed in a grid-like manner in a common reference plane parallel to the cutting table and can be adjusted together from a retracted rest position into an operating position projecting towards the cutting table perpendicular to the reference plane. To remove a blank, all suction heads of the gripper, which is aligned according to the blank to be lifted off, are positioned against the fiber layer. Of the individually controllable suction heads, only those located within the outline of the blank are subjected to vacuum, so that when all the suction heads are lifted together, only the selected blank is lifted out of the web of material formed by the fiber layer. A disadvantage, however, is that in the case of fiber webs in particular, there is a risk that the blanks will get stuck on the edge of the fiber layer remaining on the cutting table during removal, which not only impairs the position of the material web remaining on the cutting table but can also influence the position of the lifted blank in relation to the reference plane determined by the suction heads.

Similar difficulties arise in case that not all the suction heads are lowered onto the cutting table together, but only the suction heads within the contour line of the blank to be lifted, and then, after being subjected to a vacuum, are raised again from the cutting table, taking the selected blank with them (WO 03/035375 A1), because, in such a case, a local frictional fit or form fit between adjacent edge sections of the blank and the rest of the material web must be expected, at least when the selected blanks are lifted out of the material web.

SUMMARY OF THE INVENTION

The system described herein is thus based on removing a blank from a material web with the aid of a gripper which has a plurality of gripping elements distributed in a grid-like manner in a reference plane in such a way that trouble-free removal of the blank can be ensured.

In the system described herein, in addition to the gripping elements located inside the contour line of the blank in the aligned takeover position of the gripper, at least also gripping elements adjacent to the blank and located outside the contour line of the blank are placed against the material web as downholders, wherein only the gripping elements within the contour line of the blank are actuated and retracted from the material web by taking the blank with them, before the gripper is moved away from the material web out of the takeover position.

Since, as a result of these measures, not only the gripping elements located within the contour line of the blank to be removed after alignment of the gripper relative to this blank, but also gripping elements at least adjacent to this blank are lowered onto the material web and these gripping elements are used outside the contour line of the selected blank as downholders during removal of the blank from the material web, the material web is held back relative to the blank in a circumferential region around the blank to be removed, so that the blank can be released from the material web and lifted out of the material web in the reference plane determined by the gripping elements applied within the contour line of the blank, despite any frictional fits or form fits at the edges. After the blank has been released from the web, the gripping elements, which act as downholders on the web, are lifted off the web before the gripper can convey the removed blank away for further processing. The prerequisite for this is that the gripping elements are not only moved perpendicular to the reference plane but can also be controlled separately with regard to their gripping function so that the gripping elements used as downholders do not take the web with them.

For removing blanks from a flat material web, grippers can be used with a frame in which gripping elements, which define a reference plane and are distributed in a grid-like manner in the reference plane and can each be actuated separately, can be displaced perpendicularly to the reference plane independently of one another with the aid of separate actuating drives, specifically with the aid of a control device for actuating the gripping elements and the actuating drives as a function of the predetermined contour line of the blank. If particular gripping elements form downholders, then, depending on the predetermined contour line of the blank, the particular gripping elements can be used as downholders by the control device which lie in a belt surrounding the blank outside the contour of the blank, so that the blank can be released from the held-down material web without interference.

Although different gripping elements can be used depending on the properties of the material web, for example gripping elements with gripping hooks which are displaceably mounted in guide sleeves and are retracted into the guide sleeves to hold down the material web and release the blank, or gripping elements with switchable magnets, advantageous design conditions result for many applications if the gripping elements are designed as suction heads, as is known per se. In order not to have to control each suction head separately via a vacuum line, the suction heads can comprise a suction cylinder which is displaceably mounted in a frame, opens into a suction box and interacts with a coaxial control cylinder which is fixed to the frame and sealed with respect to the suction box and which suction cylinder can be displaced with the aid of the actuating drive between an extended operating position against the force of a loading spring into a release position in which the suction cylinder engages sealingly in the control cylinder.

The suction cylinders, which are held in an extended operating position by loading springs, open at least in groups into a common suction box so that the extended suction cylinders can be pressurized with vacuum from the suction box. However, if the suction cylinders are retracted into a release position via their actuating drives against the force of the loading springs, the suction cylinders engage sealingly in the control cylinders fixed to the frame, as a result of which the flow connection between the suction cylinders and the suction box is interrupted as a prerequisite for removal of the blank from the suction heads.

In order to be able to selectively apply negative pressure to the suction heads in the extended operating position of the suction cylinders, which is useful with regard to the hold-down function of the suction heads, the actuating drives can include a control piston which is displaceably guided within the control cylinder fixed to the frame and is drive-connected to the suction cylinder, wherein the drive connection between the control piston and the suction cylinder has an idle stroke between a hold-down position, in which the control piston engages sealingly in the extended suction cylinder, and a driving position, in which the control piston has exited the suction cylinder.

The idle stroke provided in the drive connection between the control piston and the suction cylinder enables the control piston connected to the actuating drive to be displaced relative to the suction cylinder, which is held in an extended operating position by the loading spring, so that when the control piston engages in the suction cylinder in a sealing manner, the latter is shut off relative to the suction box, but when the control piston is withdrawn from the suction cylinder, it is connected to the suction box. The drive connection does not become effective until after the idle stroke has been completed, so that the suction cylinder can be retracted by the control piston in a working stroke from the extended operating position to the release position.

BRIEF DESCRIPTION OF THE DRAWINGS

With the aid of the drawing, the system described herein is explained in more detail, where FIG. 5 is bottom view of the gripper according to the system described herein and FIG. 6 shows a gripper position indicated by a dashed dot and aligned with respect to a web of material for removing a blank, in a top view of the web of material.

DESCRIPTION OF VARIOUS EMBODIMENTS

Figure 1:
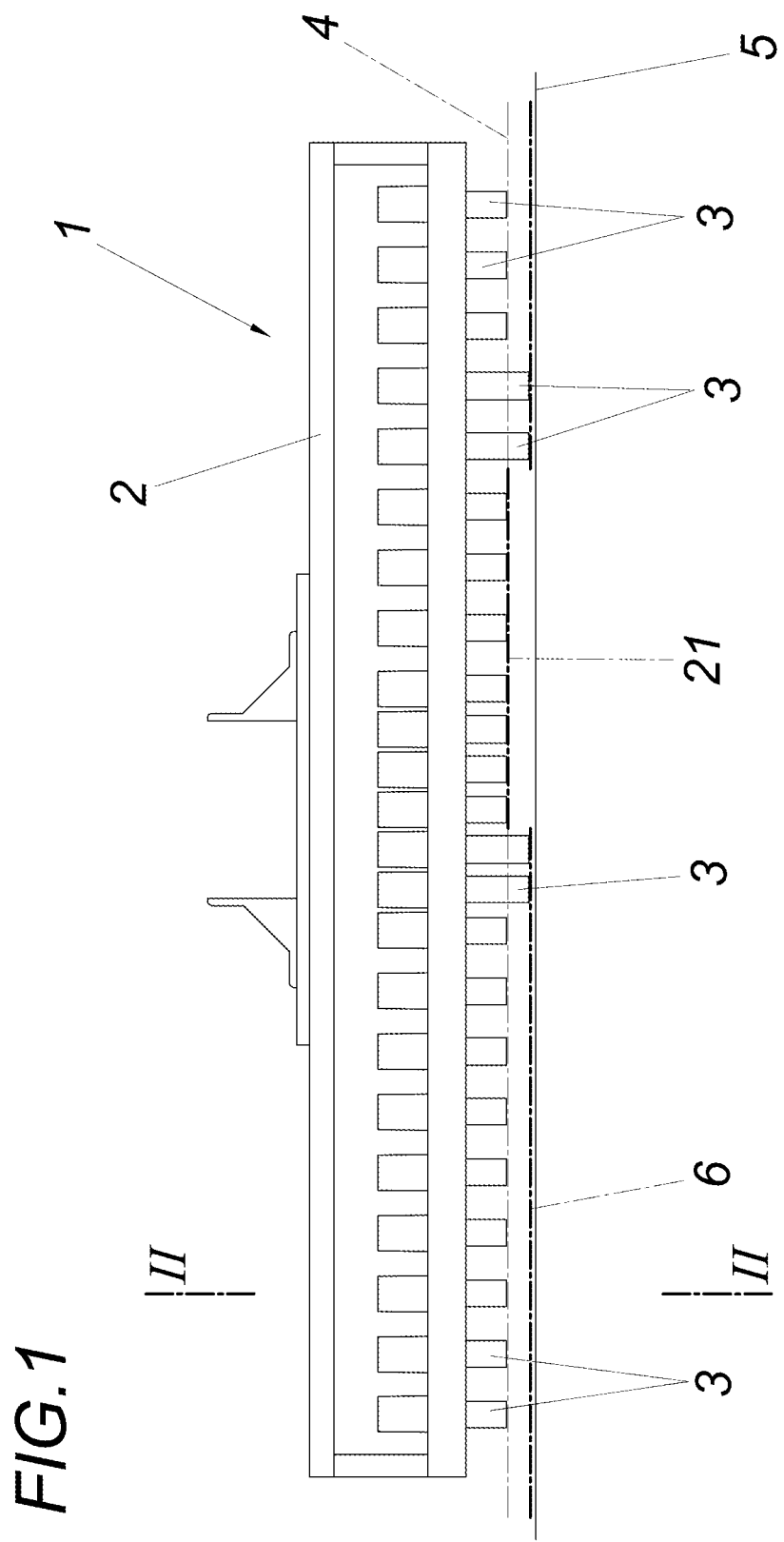
FIG. 1 is a schematic side view of a gripper according to the system described herein

The gripper 1 according to the system described herein has a frame 2 in which a plurality of gripping elements 3 are arranged. The gripping elements 3 form a reference plane 4 which runs parallel to a flat support 5 for a material web 6, for example a pre-impregnated or dry fiber material, a fabric or leather web, a film or the like. The gripping elements 3 are distributed in a grid-like manner in the reference plane 4, as can be seen from FIG. 5. The grid-like distribution need not be uniform. Denser distributions can be provided in areas where outlines of individual blanks accumulate, as indicated in the central area of the gripper 1 according to FIG. 5.

Figure 2:
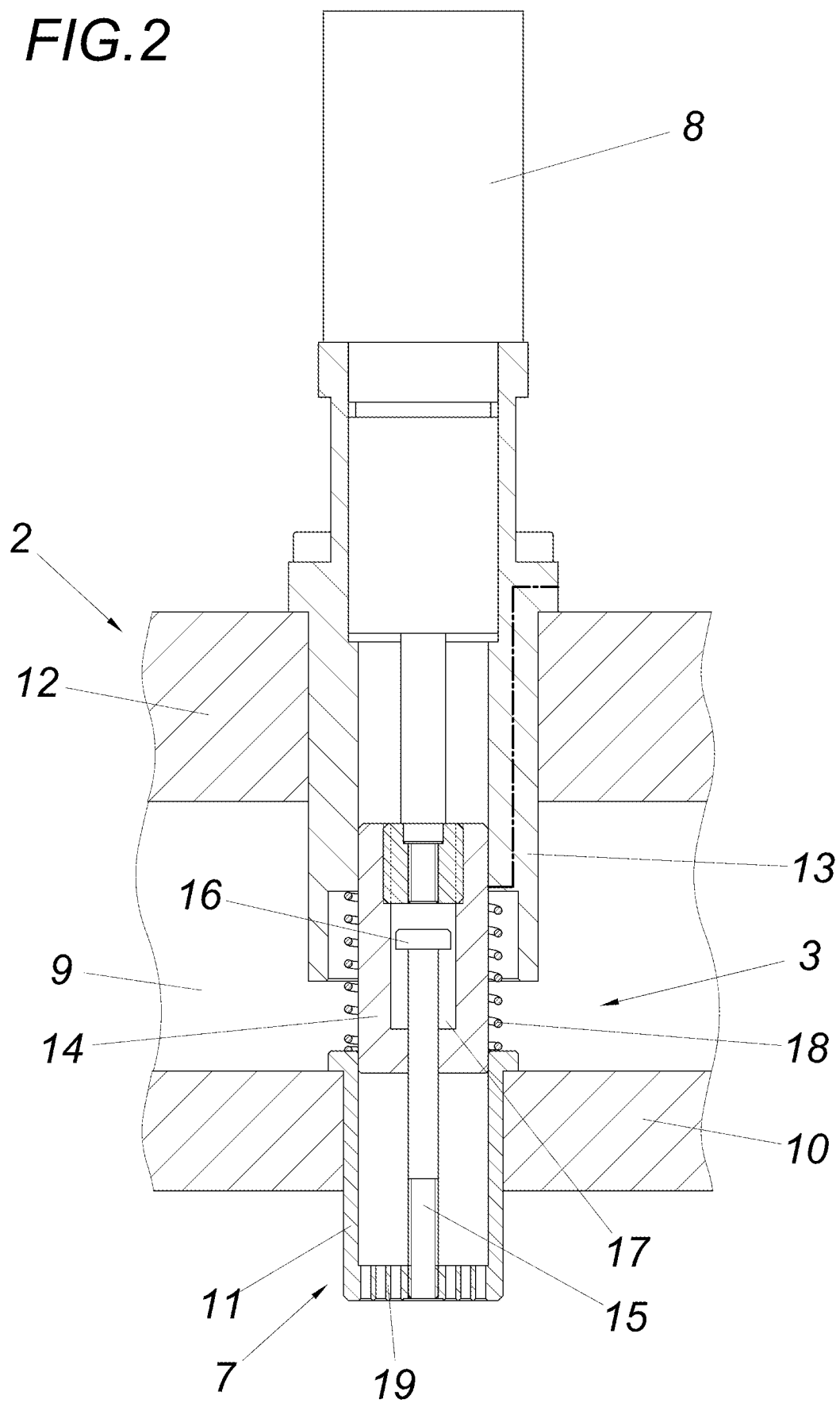
FIGS. 2 to 4 show a sectional view following line II-II of FIG. 1 in different positions of the gripping elements on a larger scale.
Figure 3:
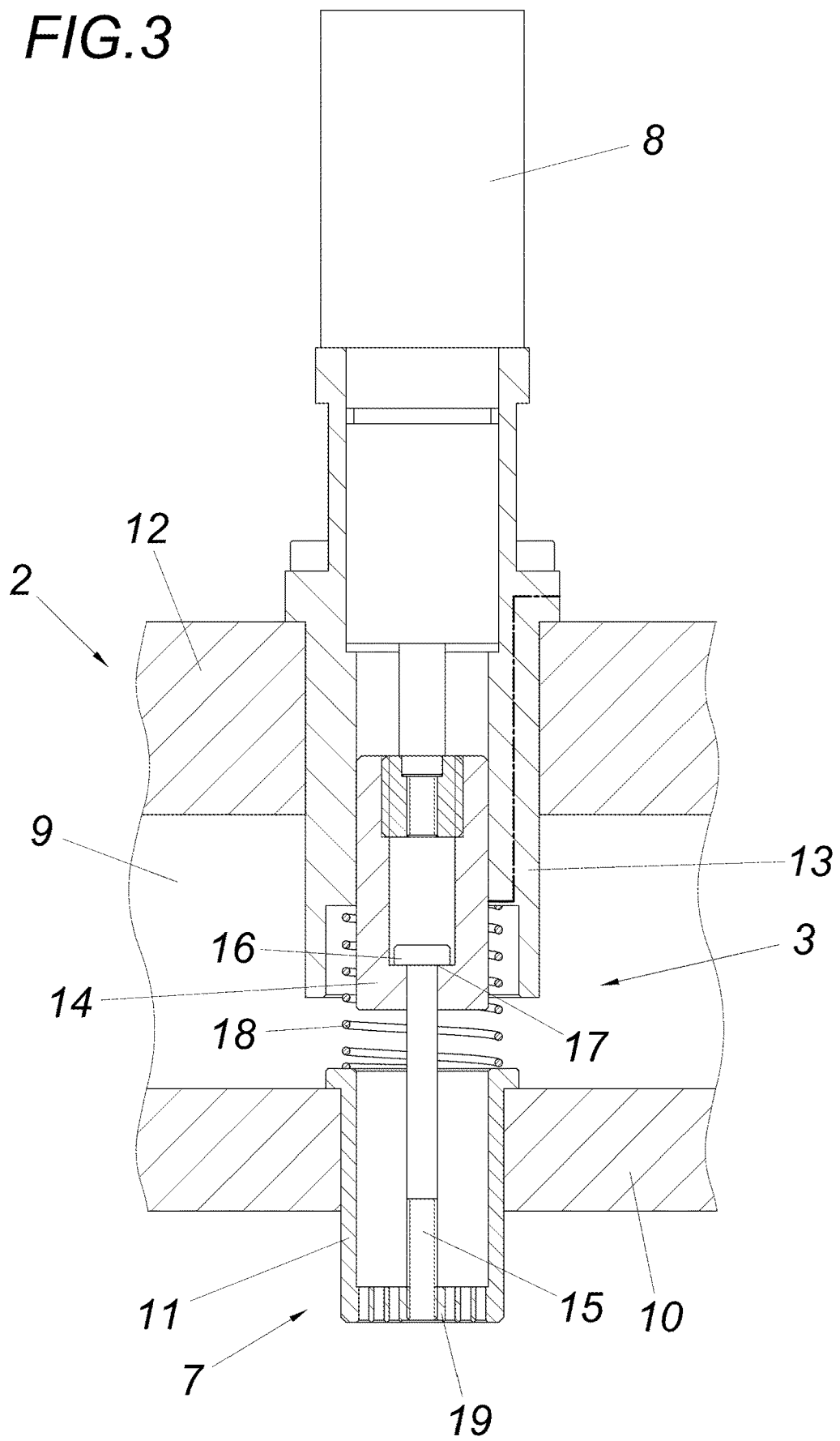
Figure 4:
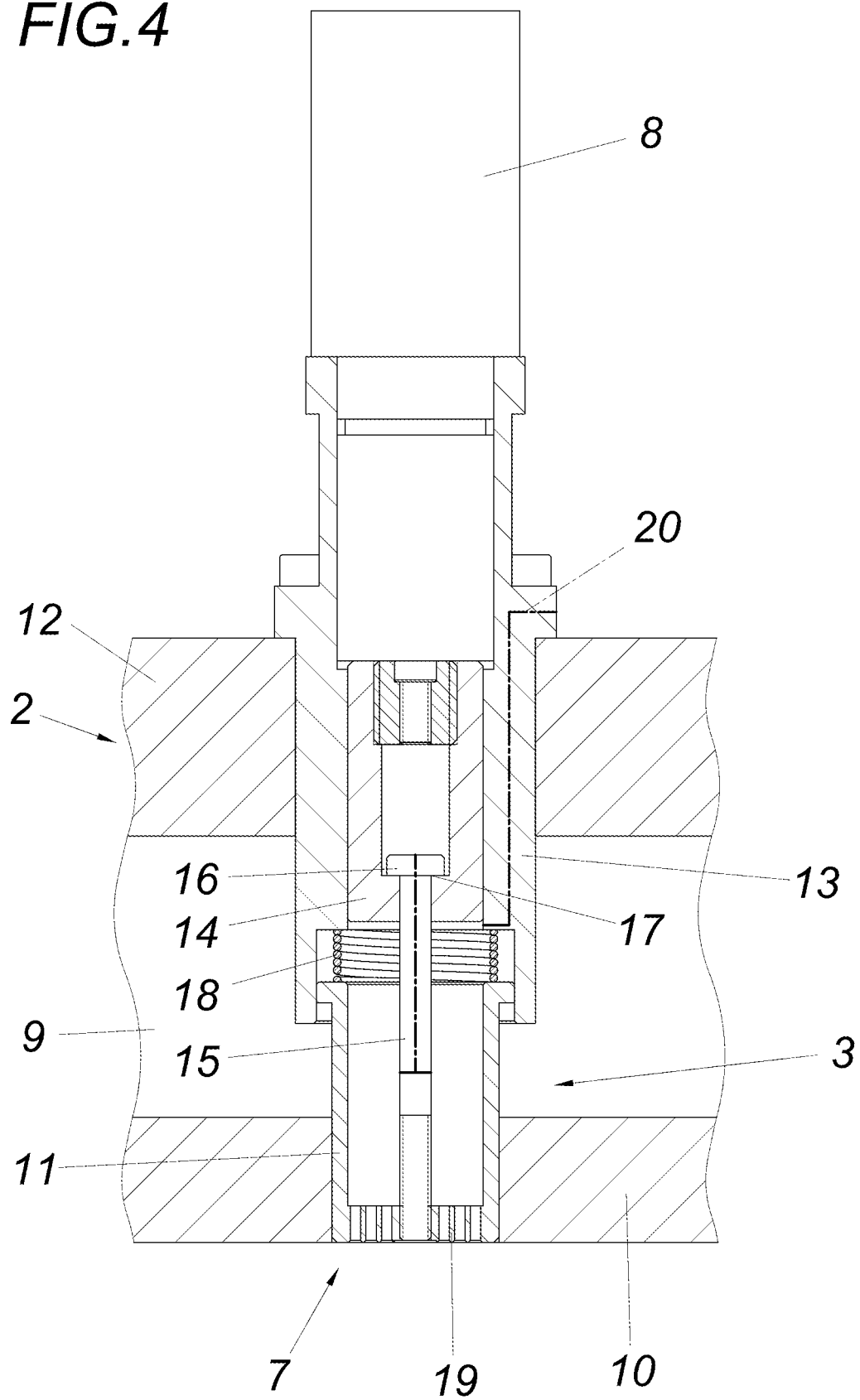

Although the gripping elements 3 can grip the blanks, for example mechanically or magnetically, depending on the properties of the material web 6, for most applications there are advantageous specifications with gripping elements 3 that form a suction head 7, as shown in FIGS. 2 to 4. Regardless of the type of gripping elements 3, the gripping elements 3 is mounted in the frame 2 so as to be displaceable perpendicularly to the reference plane 4 and is displaced with the aid of an actuating drive 8 between an extended operating position as shown in FIG. 2 and a retracted release position as shown in FIG. 4. Like the gripping elements 3 themselves, the actuating drives are controlled by a control device (not shown in FIGS. 2 to 4 for reasons of clarity) as a function of the contour lines of the blanks. The control device 23 is shown in FIG. 5.

According to FIGS. 2 to 4, the frame 2 forms a suction box 9, in the bottom 10 of which the suction heads 7 formed by a suction cylinder 11 are mounted so as to be axially displaceable. Coaxial with the suction cylinders 11, control cylinders 13 are tightly inserted in the ceiling 12 of the suction box 9, in which the suction cylinders 11 engage in a sealing manner in a retracted release position according to FIG. 4.

Within the control cylinder 13, which is fixed to the frame, a control piston 14 is mounted for axial displacement, which is connected to the actuating drive 8 and is drive-connected to the suction cylinder 11 via an idle stroke. The idle stroke is achieved by a tie rod 15, which is connected to the suction cylinder 11 in a tension-proof manner, passes through the control piston 14 and has a stop head 16 which, after an idle stroke, stops against a driver stop 17 of the control piston 14. The suction cylinder 11 is held in the extended operating position as shown in FIGS. 2 and 3 by means of a loading spring 18, which is supported on the fixed control cylinder 13.

If, as shown in FIG. 2, the control piston 14 actuated by the actuating drive 8 engages sealingly in the extended suction cylinder 11, the suction cylinder 11 is shut off from the suction box 9 so that the suction cylinder 11 is ventilated, namely via the perforated cylinder base 19. If the actuating drive 8 is operated from this initial position of the control piston 14, the control piston 14 is pulled out of engagement with the suction cylinder 11 and releases the end opening of the suction cylinder 11 opening with the opening into the suction box 9, so that the suction cylinder 11 is pressurized with vacuum via the suction box 9, as illustrated by FIG. 3. The extended operating position of the suction cylinder 11 remains due to the action of the loading spring 18 until the stop head 16 strikes against the driver stop 17 of the tie rod 15 and the suction cylinder 11 is moved by the resulting drive connection between the suction cylinder 11 and the control piston 14 against the force of the loading spring 18 from the extended operating position according to FIG. 3 into a release position according to FIG. 4, in which the suction cylinder 11 engages sealingly in the control cylinder 13, whereby the suction cylinder 11 is closed again with respect to the suction box 9. In the event that an air-impermeable blank is to be lifted via the suction cylinder 11, the vacuum in the suction cylinder 11 would not decrease after the suction cylinder 11 sealingly engages the control cylinder 13. For this reason, the suction cylinder 11 can be aerated via an aeration line 20 that is preferably controllable by the control piston 14, which is schematically indicated in FIGS. 2 to 4.

In order to lift a blank 21 out of a material web 6 with several blanks, the gripper 1 as shown in FIG. 6 is first aligned with respect to the blank 21 to be picked up in accordance with a pick-up position relative to the material web 6. The cross-hatched suction heads 7 located within the contour line 22 of the blank 21 in the aligned transfer position of the gripper 1, together with the suction heads 7 indicated by empty circles, which are arranged in a belt enclosing the blank 21 to be picked up, are set against the evenly lying material web 6, the control pistons 14 assuming the position shown in FIG. 2, in which the suction cylinders 11 are ventilated. After the suction cylinders 11 have been placed against the material web 6, the suction cylinders 11 of the suction heads 7 located inside the contour line 22 of the blank 21 are acted upon with vacuum by the control pistons 14 being retracted into a position as shown in FIG. 3, in order to then lift these suction heads 7 into a conveying position, entraining the blank 21 sucked onto the cylinder bases 19, as indicated in FIG. 1. The suction heads 7, which are located outside the contour line 22 of the blank 21 and are attached to the material web 6, remain in the position shown in FIG. 2 as downholders during the lifting of the blank 21 out of the material web 6, so that the blank 21 can be lifted out of the material web 6 retained by the down-holders without interference. The lifted blank 21 can then be conveyed away by the gripper 1 for further processing, the release of the blank 21 from the gripper 1 being effected by a retraction of the control piston 14 into the release position according to FIG. 4, in which the suction cylinder 11 is ventilated.

The invention claimed is:

1. A method of controlling a gripper which removes a blank from a web of material lying flat, comprising:
   separately actuating gripping elements of the gripper that form a reference plane parallel to the web of material and are distributed in the reference plane, wherein the gripping elements are mounted independently of one another in a frame so as to be displaceable perpendicularly to the reference plane between an extended operating position and a retracted release position using a separate actuating drive for each of the gripping elements;
   aligning the gripping elements with respect to the blank in a takeover position of the gripper, wherein some of the gripping elements are located inside a contour line of the blank and some of the gripping elements are located adjacent to the blank and outside the contour line;
   setting the gripping elements against the material web, wherein gripping elements located outside the contour line are set against the material web as downholders;
   actuating the actuating drive for each of the gripping elements using a control device, wherein only the gripping elements within the contour line of the blank are actuated and retracted from the material web before the gripper is moved away from the material web from the takeover position.

2. The method according to claim 1, wherein the gripping elements are suction heads.

3. The method of claim 2, wherein the suction heads include a suction cylinder which is displaceably mounted in a frame, opens into a suction box and interacts with a coaxial control cylinder, which is fixed to the frame and sealed with respect to the suction box and wherein the suction cylinder is displaceable with the aid of the actuating drive between an extended operating position against the force of a loading spring into a release position in which the suction cylinder engages sealingly in the control cylinder.

4. The method of claim 3, wherein the actuating drives include a control piston which is displaceably guided within the control cylinder fixed to the frame, the control piston being drive-connected to the suction cylinder, wherein the drive connection between the control piston and the suction cylinder has an idle stroke between a hold-down position, in which the control piston engages sealingly in the suction cylinder, and a driving position, in which the control piston has exited the suction cylinder.

5. A gripper for removing a blank from a web of material lying flat, comprising:
   a frame having gripping elements that are distributed in a reference plane defined by the gripping elements, wherein the gripping elements are separately actuatable and are displaceable independently of one another between an extended operating position and a retracted release position perpendicularly to the reference plane with the aid of separate actuating drives for each of the gripping elements; and
   a control device that actuates the actuating drive for each of the gripping elements and the actuating drives as a function of a predetermined contour line of the blank, wherein a subset of the gripping elements form down-holders which are actuated by the control device as a function of the contour line of the blank.

6. The gripper according to claim 5, wherein the gripping elements are suction heads.

7. A gripper for removing a blank from a web of material lying flat, comprising:
   a frame having gripping elements that are distributed in a reference plane defined by the gripping elements, wherein the gripping elements are separately actuatable and are displaceable independently of one another perpendicularly to the reference plane with the aid of separate actuating drives; and
   a control device that actuates the gripping elements and the actuating drives as a function of a predetermined contour line of the blank, wherein a subset of the gripping elements form downholders which are actuated by the control device as a function of the contour line of the blank, wherein the gripping elements are— suction heads and wherein the suction heads include a suction cylinder which is displaceably mounted in a frame, opens into a suction box and interacts with a coaxial control cylinder, which is fixed to the frame and sealed with respect to the suction box and wherein the suction cylinder is displaceable with the aid of the actuating drive between an extended operating position against the force of a loading spring into a release position in which the suction cylinder engages sealingly in the control cylinder.

8. The gripper according to claim 7, wherein the actuating drives include a control piston which is displaceably guided within the control cylinder fixed to the frame, the control piston being drive-connected to the suction cylinder, wherein the drive connection between the control piston and the suction cylinder has an idle stroke between a hold-down position, in which the control piston engages sealingly in the suction cylinder, and a driving position, in which the control piston has exited the suction cylinder.

* * * * *